US008962965B2

(12) United States Patent
Nagasaka

(10) Patent No.: US 8,962,965 B2
(45) Date of Patent: Feb. 24, 2015

(54) MUSICAL SOUND GENERATION DEVICE, STORAGE MEDIUM, AND MUSICAL SOUND GENERATION METHOD

(71) Applicant: Casio Computer Co., Ltd., Shibuya-ku, Tokyo (JP)

(72) Inventor: Hiroaki Nagasaka, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 110 days.

(21) Appl. No.: 13/723,749

(22) Filed: Dec. 21, 2012

(65) Prior Publication Data

US 2013/0233153 A1 Sep. 12, 2013

(30) Foreign Application Priority Data

Mar. 9, 2012 (JP) ................................ 2012-052616

(51) Int. Cl.
*G01H 7/00* (2006.01)

(52) U.S. Cl.
CPC ................ *G01H 7/02* (2013.01); *G01H 7/002* (2013.01); *G01H 7/06* (2013.01)
USPC ........................................................ 84/604

(58) Field of Classification Search
CPC ..... G01H 1/0058; G01H 1/183; G01H 1/187; G11B 2020/10592
USPC ................................................ 84/604–607
See application file for complete search history.

(56) References Cited

U.S. PATENT DOCUMENTS

| | | | | |
|---|---|---|---|---|
| 4,348,928 A * | 9/1982 | Sakashita et al. | 84/604 |
| 5,243,658 A * | 9/1993 | Sakata | 381/62 |
| 5,383,386 A * | 1/1995 | Kudo et al. | 84/622 |
| 5,861,567 A * | 1/1999 | Hirano | 84/609 |
| 5,892,170 A * | 4/1999 | Ichiki et al. | 84/605 |
| 7,381,879 B2 * | 6/2008 | Tamura | 84/604 |
| 2005/0211070 A1 * | 9/2005 | Tamura | 84/603 |
| 2007/0101854 A1 | 5/2007 | Fujisaka et al. | |
| 2013/0125734 A1 * | 5/2013 | Kashiwazaki et al. | 84/615 |

FOREIGN PATENT DOCUMENTS

| | | |
|---|---|---|
| JP | 10-097258 A | 4/1998 |
| JP | 2003-157082 A | 5/2003 |
| JP | 2003-330469 A | 11/2003 |
| JP | 2007-148377 A | 6/2007 |

OTHER PUBLICATIONS

Japanese Office Action dated Feb. 25, 2014 (and English translation thereof) in counterpart Japanese Application No. 2012-052616.

* cited by examiner

*Primary Examiner* — Jeffrey Donels
(74) *Attorney, Agent, or Firm* — Holtz, Holtz, Goodman & Chick PC

(57) ABSTRACT

An address for reading, from a waveform memory connected by a bus, waveform data to be assigned to each of a plurality of sound generation channels for generating a musical sound, is calculated, by time division, for each sound generation channel, and the calculated address and the sound generation channels are associated and stored in an address memory. When the bus is in an empty state, an address stored in the address memory is read, and waveform data is read from the waveform memory based on the read address; the read waveform data is assigned to the corresponding sound generation channel, and generation of a musical sound is prescribed for the sound generation channel to which the waveform data is assigned.

8 Claims, 13 Drawing Sheets

FIG.12

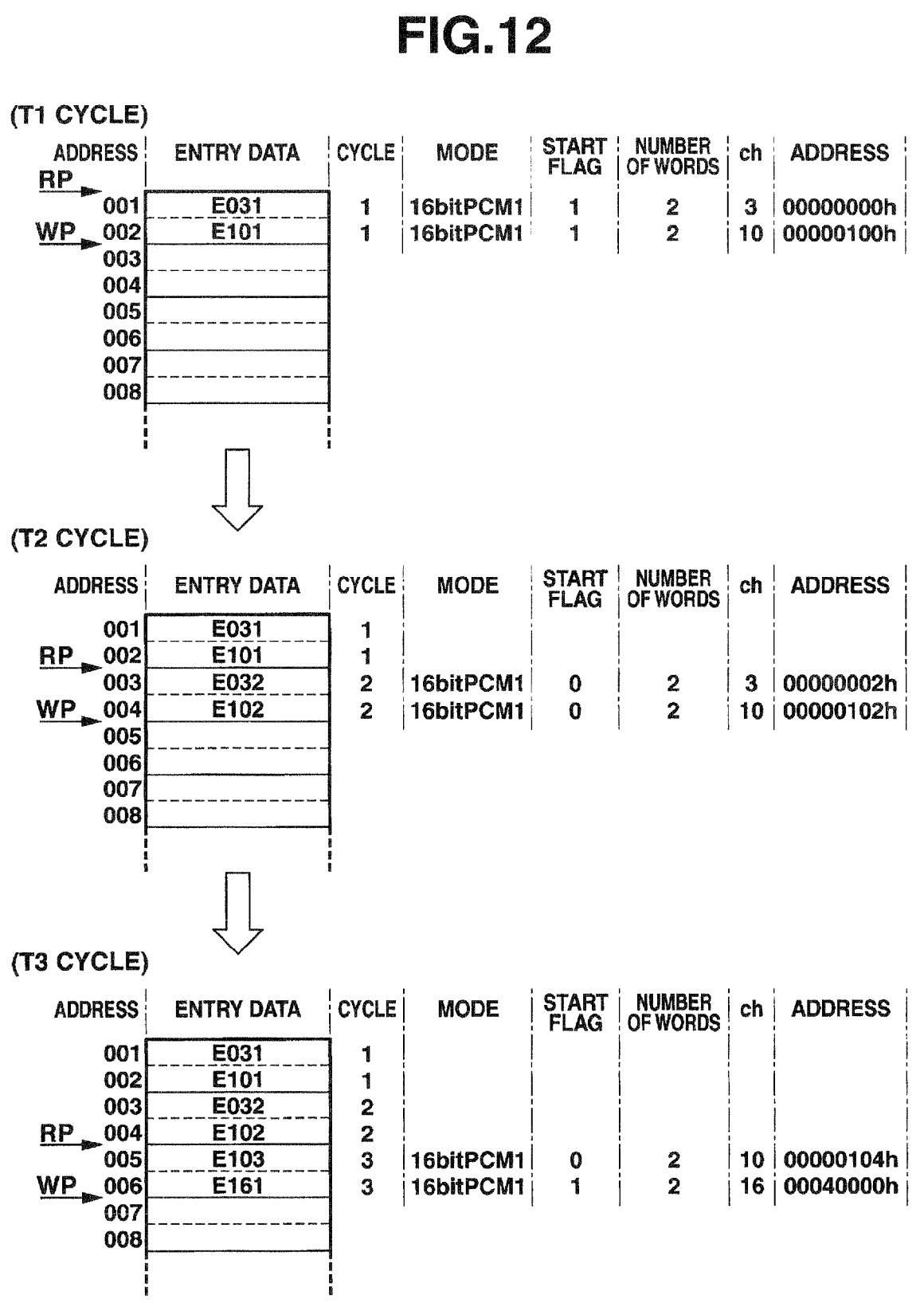

(T1 CYCLE)

| | ADDRESS | ENTRY DATA | CYCLE | MODE | START FLAG | NUMBER OF WORDS | ch | ADDRESS |
|---|---|---|---|---|---|---|---|---|
| RP | 001 | E031 | 1 | 16bitPCM1 | 1 | 2 | 3 | 00000000h |
| WP | 002 | E101 | 1 | 16bitPCM1 | 1 | 2 | 10 | 00000100h |
| | 003 | | | | | | | |
| | 004 | | | | | | | |
| | 005 | | | | | | | |
| | 006 | | | | | | | |
| | 007 | | | | | | | |
| | 008 | | | | | | | |

(T2 CYCLE)

| | ADDRESS | ENTRY DATA | CYCLE | MODE | START FLAG | NUMBER OF WORDS | ch | ADDRESS |
|---|---|---|---|---|---|---|---|---|
| | 001 | E031 | 1 | | | | | |
| RP | 002 | E101 | 1 | | | | | |
| | 003 | E032 | 2 | 16bitPCM1 | 0 | 2 | 3 | 00000002h |
| WP | 004 | E102 | 2 | 16bitPCM1 | 0 | 2 | 10 | 00000102h |
| | 005 | | | | | | | |
| | 006 | | | | | | | |
| | 007 | | | | | | | |
| | 008 | | | | | | | |

(T3 CYCLE)

| | ADDRESS | ENTRY DATA | CYCLE | MODE | START FLAG | NUMBER OF WORDS | ch | ADDRESS |
|---|---|---|---|---|---|---|---|---|
| | 001 | E031 | 1 | | | | | |
| | 002 | E101 | 1 | | | | | |
| | 003 | E032 | 2 | | | | | |
| RP | 004 | E102 | 2 | | | | | |
| | 005 | E103 | 3 | 16bitPCM1 | 0 | 2 | 10 | 00000104h |
| WP | 006 | E161 | 3 | 16bitPCM1 | 1 | 2 | 16 | 00040000h |
| | 007 | | | | | | | |
| | 008 | | | | | | | |

MUSICAL SOUND GENERATION DEVICE, STORAGE MEDIUM, AND MUSICAL SOUND GENERATION METHOD

This application is based upon and claims the benefit of priority from the prior Japanese Patent Application No. 2012-52616, filed Mar. 9, 2012, and the entire contents of which are incorporated herein by reference.

BACKGROUND OF THE INVENTION

1. Field of the Invention

The present invention relates to a musical sound generation device for generating musical sound by reading waveform data, a storage medium, and a musical sound generation method.

2. Related Art

A musical sound generation device is conventionally known that stores sampled waveform data and reads the data to generate musical sound of a variety of frequencies.

For example, Japanese Unexamined Patent Publication No. 2003-157082 describes technology in which data of a sound source encoded by PCM (Pulse Coded Modulation) is read by time division, into respective time slots of respective channels in one sample cycle, to synthesize musical sounds of a plurality of channels.

In technology described in Japanese Unexamined Patent Publication No. 2003-157082, a process is repeated in which waveform data is read from memory, in time slots of respective channels, and musical sound is synthesized and outputted.

However, conventional musical sound generation devices, including the technology described in Japanese Unexamined Patent Publication No. 2003-157082, may be configured to have a shared memory in which the memory storing the waveform data is shared with another application, due to cost reduction demands.

In a case in which the memory storing the waveform data is shared, there may be an increase in the probability of collisions with regard to access to memory by plural processes, resulting in access to memory being made to wait, and leading to delays in processing.

In particular, in a case of an increase in the number of musical channels that can be simultaneously generated, this type of situation becomes conspicuous.

In this way, in a conventional musical sound generation device, processing efficiency for generating musical sound has not been sufficiently high.

SUMMARY OF THE INVENTION

The present invention has been realized in consideration of this type of situation, and has as an object the raising of processing efficiency for generating musical sound in a musical sound generation device.

In order to achieve the abovementioned object, a musical sound generation device according to an aspect of the present invention includes: a plurality of sound generation channels that generate musical sound; an address calculator that calculates an address in order to read, from a waveform memory connected by a bus, waveform data to be assigned to the respective sound generation channels, by time division for each of the sound generation channels; an address memory that associates and stores addresses calculated by the address calculator and the sound generation channels; a waveform data reader that reads an address stored in the address memory, when the bus is in an empty state, and reads waveform data from the waveform memory based on the read address; and a waveform generation prescription unit that prescribes assigning waveform data read by the waveform data reader to a corresponding sound generation channel, and generating a musical sound for the sound generation channel to which said waveform data is assigned.

BRIEF DESCRIPTION OF THE DRAWINGS

FIG. 12 is a schematic diagram showing states in which entry data is stored in RAM;

DETAILED DESCRIPTION OF THE INVENTION

A description is given below of embodiments of the present invention, using the drawings.

First Embodiment

Overall Configuration

Figure 1:
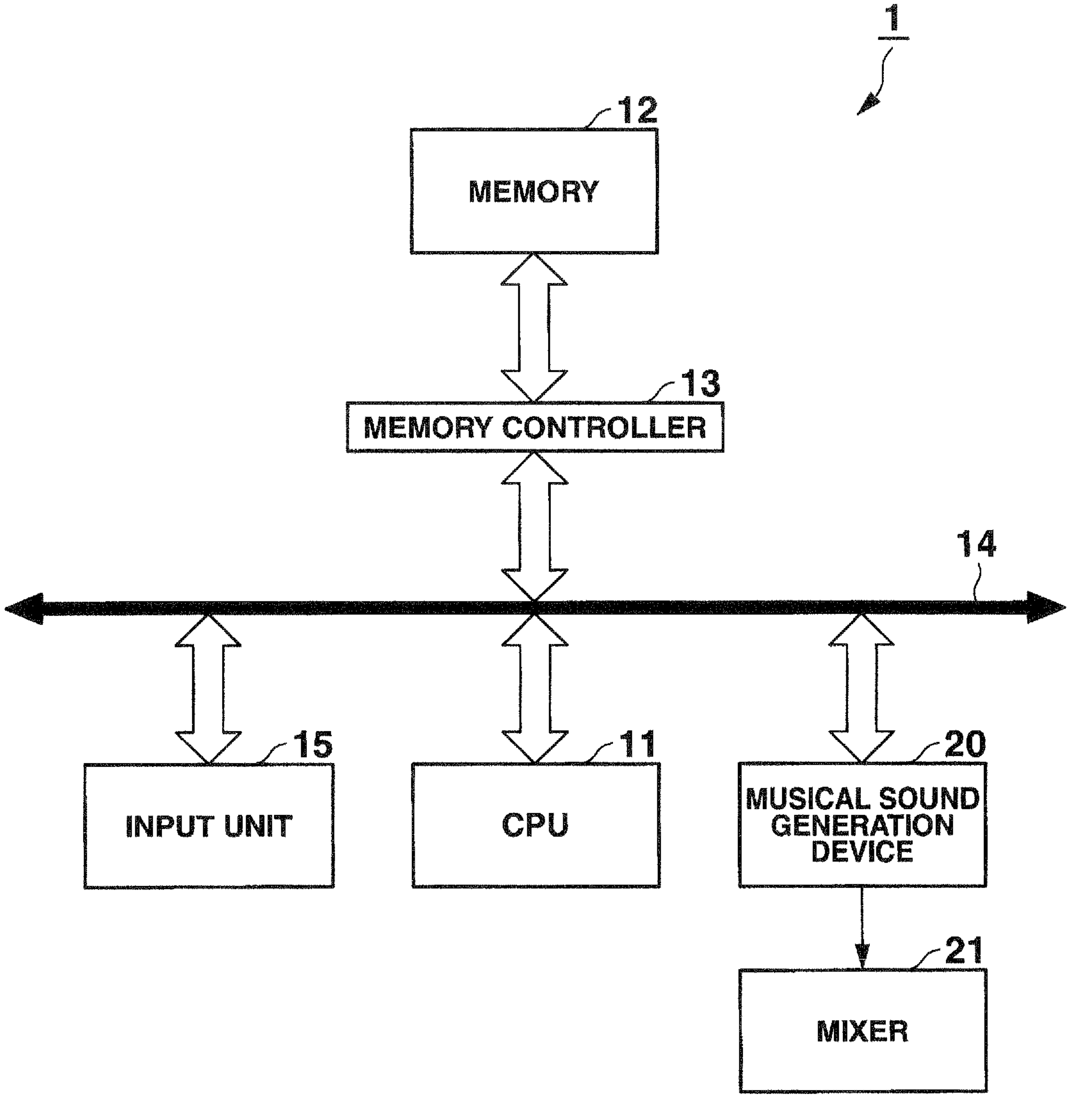
FIG. 1 is a block diagram showing a configuration of hardware of an electronic musical instrument provided with a musical sound generation device according to an embodiment of the present invention.

FIG. 1 is a block diagram showing a configuration of hardware of an electronic musical instrument provided with a musical sound generation device according to an embodiment of the present invention.

The musical sound generation device 20 is configured, for example, as a sound source of the electronic musical instrument 1. It is to be noted that in the present embodiment a description is given citing a case in which the electronic musical instrument 1 is realized as a keyboard instrument such as an electronic piano or the like, but configurations with other musical instruments are also possible.

In FIG. 1, the electronic musical instrument 1 is provided with a memory 12 formed of a CPU (Central Processing Unit) 11, a ROM (Read Only Memory), a RAM (Random Access Memory) or the like, a memory controller 13, a bus 14, an input unit 15, the musical sound generation device 20, and a mixer 21.

The CPU 11 executes various types of process in accordance with a program recorded in the ROM, which is inside the memory 12. For example, the CPU 11 executes a process of generating, in the musical sound generation device 20, sound corresponding to a key-pressing action inputted via the input unit 15 formed of a keyboard, or executes a process related to a setting of the electronic musical instrument 1 inputted by a user.

Furthermore, with regard to the CPU 11 or the musical sound generation device 20 executing various types of process, necessary data and the like are stored as appropriate in the RAM within the memory 12. That is, the RAM forms shared memory that is shared by respective functional parts in the overall electronic musical instrument 1. Specifically, parameters and the like, used when the various types of process for screen display are executed by the CPU 11, are stored in the RAM.

The memory controller 13 controls access to memory by the CPU 11 or the musical sound generation device 20. Specifically, the memory controller 13 operates as a bus slave with regard to the CPU 11 that operates as a bus master or the musical sound generation device 20, and reads data from a prescribed address in response to a request from the bus master.

The CPU 11 and the memory 12 are connected to one another via a bus 14. Furthermore, the input unit 15 and the musical sound generation device 20 are also connected to the bus 14.

An input unit 15 is provided with the keyboard and a switch for inputting various types of information. The input unit 15, in a case where a key is pressed, outputs a key number for identifying the key, and information (referred to below as "velocity") indicating the intensity with which the key was pressed, to the CPU 11, and outputs various types of information inputted by the user to the CPU 11.

Besides these, the electronic musical instrument 1 may have a display or a speaker and DAC, or the like, for outputting an image or voice. Moreover, a hard disk or DRAM (Dynamic Random Access Memory) for storing various types of program and data for controlling the electronic musical instrument 1 may be added.

The musical sound generation device 20 reads waveform data stored in the memory 12, in response to an instruction of the CPU 11, and generates a musical sound (specifically, a digital signal expressing a musical sound). In the present embodiment, a description is given in which the musical sound generation device 20 has a polyphonic function that can simultaneously generate sound in 128 channels, and executes processing to generate sounds in each channel ch0 to ch127, for each one cycle (time slot) obtained by dividing one sample cycle into 128 parts. It is to be noted that a specific configuration of the musical sound generation device 20 will be described later.

The mixer 21 synthesizes a musical sound generated by the musical sound generation device 20, and outputs to a DAC or the like, not shown in the drawings. The DAC converts a digital signal representing a musical sound inputted from the mixer 21 to an analog signal, and outputs to a speaker or the like.

Configuration of the Musical Sound Generation Device 20

Next, a description is given concerning a configuration of the musical sound generation device 20.

Figure 2:
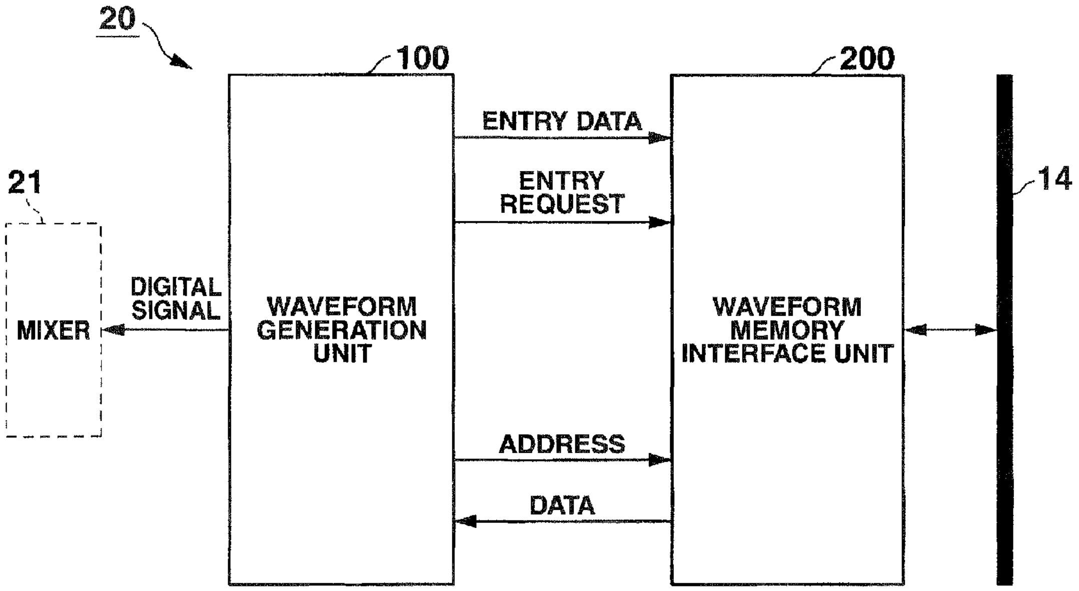
FIG. 2 is a block diagram showing a configuration of the musical sound generation device.

FIG. 2 is a block diagram showing the configuration of the musical sound generation device 20.

In FIG. 2, the musical sound generation device 20 is provided with a waveform generation unit 100 and a waveform memory interface unit 200. Both the waveform generation unit 100 and the waveform memory interface unit 200 are connected to a bus 14, and the waveform generation unit 100 supplies an entry request, entry data, and an address to the waveform memory interface unit 200, and conversely receives data from the waveform memory interface unit 200.

Configuration of the Waveform Generation Unit 100

Figure 3:
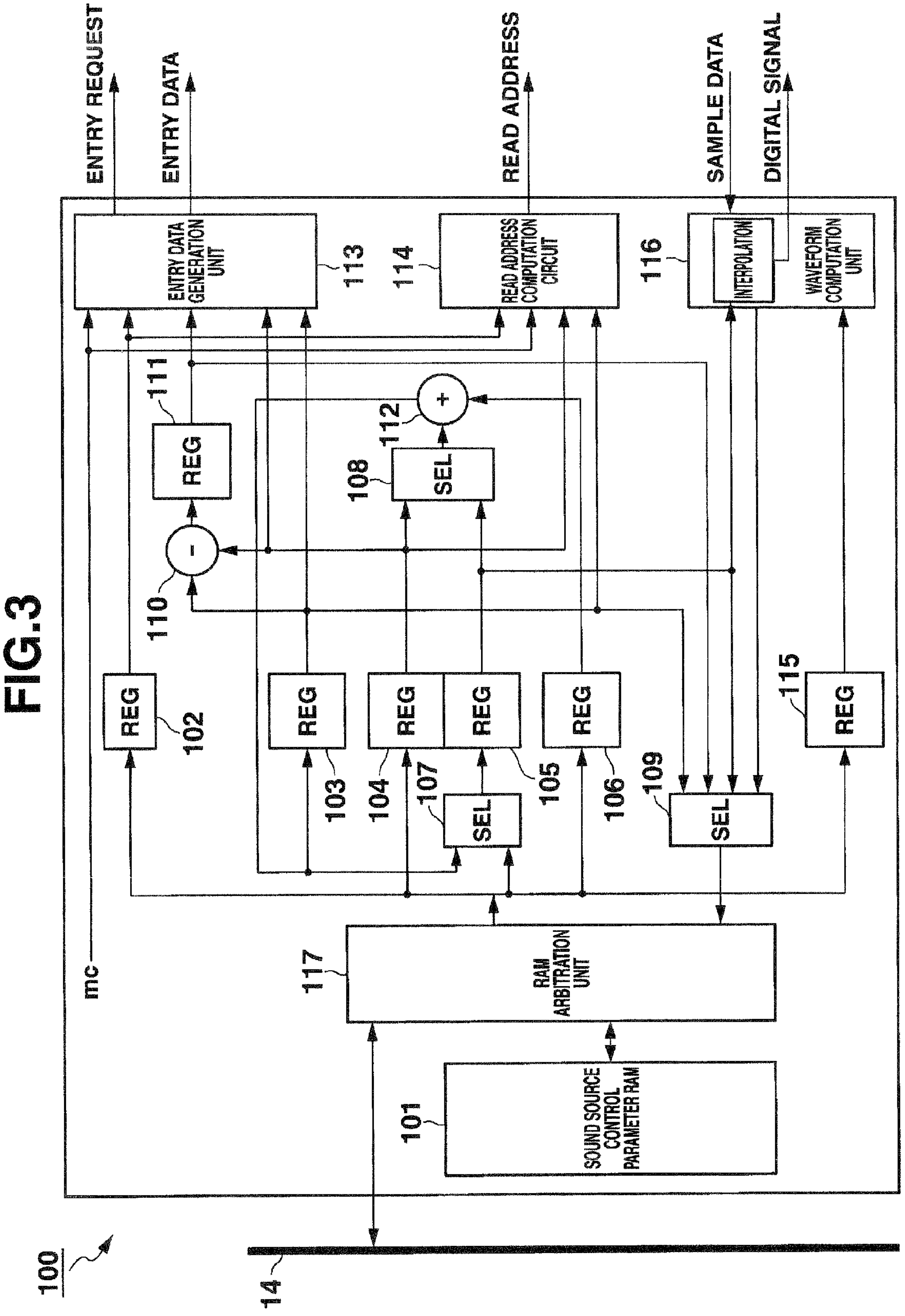
FIG. 3 is a block diagram showing a specific configuration of a waveform generation unit.

FIG. 3 is a block diagram showing a specific configuration of the waveform generation unit 100.

The waveform generation unit 100 operates in accordance with a master counter mc generated based on a system clock of the musical sound generation device 20. Specifically, 128 time slots for the respective channels ch0 to ch127 are prescribed by upper 7 bits of the master counter mc configured as a counter of 11 bits. Respective time slots for lower 4 bits of the master counter mc are further divided into 16 fields.

With the start of time slots of the respective channels ch0 to ch127, in accordance with the master counter mc sequentially inputted, as a trigger, the waveform generation unit 100 calculates an address of the memory 12 corresponding to each channel, and outputs to the waveform memory interface unit 200 with entry information of the channels.

Then, until finish timing of the timeslot of the channel in question with regard to a subsequent sampling cycle, a digital signal representing a musical sound is generated using the waveform data inputted from the waveform memory interface unit 200, and is outputted to the mixer 21.

In FIG. 3, the waveform generation unit 100 is provided with: a sound source control parameter RAM 101, a mode register 102, address registers 103 to 105, a pitch register 106, selectors 107 to 109, a subtractor 110, a step value register 111, an adder 112, an entry data generation unit 113, a read address computation circuit 114, a previous-time step value register 115, a waveform computation unit 116, and a RAM arbitration unit 117. It is to be noted that a selection signal showing which input signal is selected is inputted from the CPU (not shown in the drawing), in accordance with processing content of the waveform generation unit 100, to the selectors 107 to 109, and data used in a stage of each process is delivered to a process of a subsequent stage.

The RAM arbitration unit 117 performs control with regard to access by the CPU 11 to each of the registers described above via the bus 14, and to selection of operation of the selectors described above.

A storage area corresponding to the respective channels ch0 to ch127 is formed in the sound source control parameter RAM 101, and various parameters (referred to below as "sound source control parameters") that control sound sources are stored in each of the storage areas.

Figure 4:
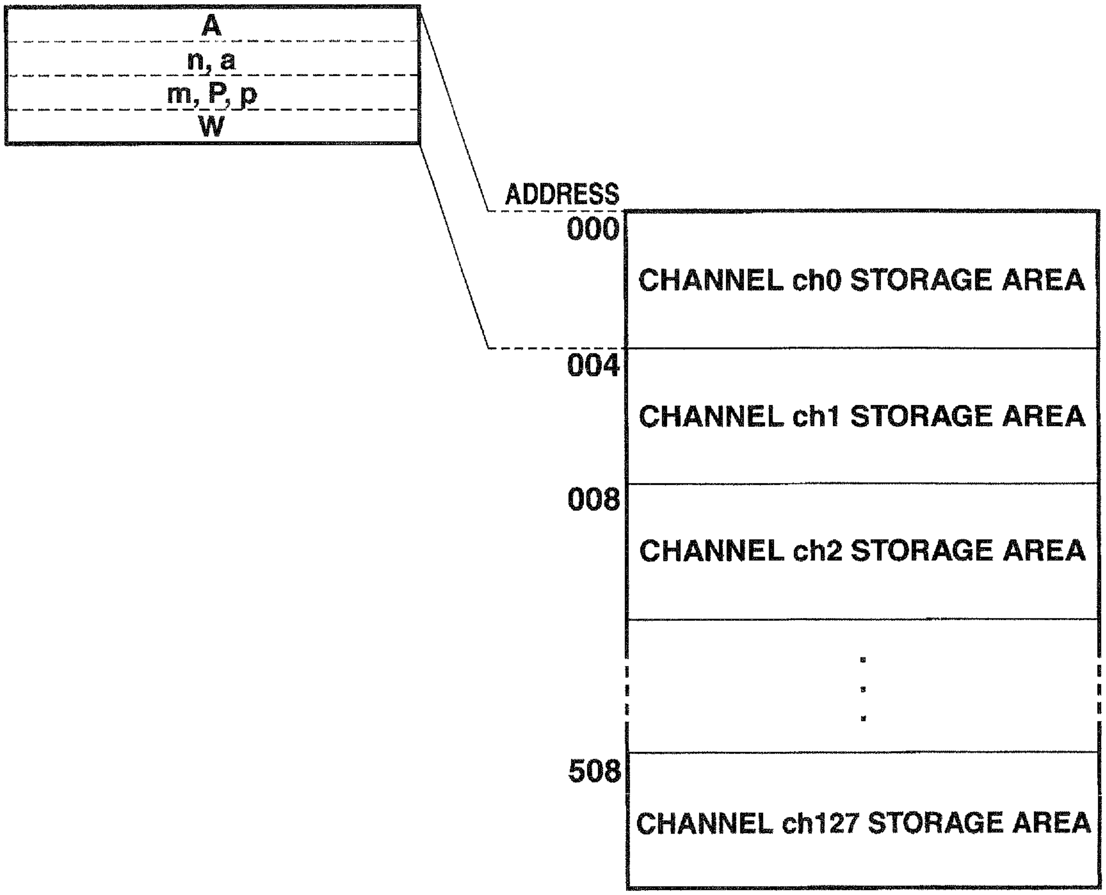
FIG. 4 is a schematic diagram showing a format of a sound source control parameter.

FIG. 4 is a schematic diagram showing a format of a sound source control parameter stored in the sound source control parameter RAM 101.

In FIG. 4, storage areas corresponding to the channels ch0 to ch127 are formed in the sound source control parameter RAM 101, and a waveform address integer part A, a waveform address decimal part a, an address step value n, a replay mode value m, a replay pitch data integer part P, a replay pitch data decimal part p, and a wave peak value W are stored in the storage areas of the respective channels. It is to be noted that the addresses shown in FIG. 4 schematically represent respective storage areas.

The waveform address integer part A represents an integer part in a read address of the memory 12, and the waveform address decimal part a represents a decimal part in a read address of the memory 12.

The address step value n represents a step value from a current read address in the memory 12.

The replay mode value m represents a replay mode indicating whether musical sound is replayed based on PCM, or is replayed based on differential PCM.

The replay pitch data integer part P represents an integer part in pitch width accompanying pitch when waveform sample data is read, and the replay pitch data decimal part p represents an integer part in pitch width.

The wave peak value W represents a wave peak value of sample data read from the memory 12 in the previous sampling cycle.

Returning to FIG. 3, the mode register 102 temporarily stores the replay mode value m read from the sound source control parameter RAM 101 via the RAM arbitration unit 117, and the stored replay mode value m is outputted to the entry data generation unit 113.

The address register 103 temporarily stores the waveform address integer part A of an address (a next read address in the memory 12) calculated by the adder 112, and outputs the stored waveform address integer part A to the selector 109, the subtractor 110 and the entry data generation unit 113.

The address register 104 temporarily stores the waveform address integer part A read from the sound source control parameter RAM 101 via the RAM arbitration unit 117, and outputs the stored waveform address integer part A to the selector 108, the subtractor 110, the entry data generation unit 113, and the read address computation circuit 114.

The address register 105 temporarily stores the waveform address decimal part a inputted from the selector 107, and outputs the stored waveform address decimal part a to the selectors 108 and 109, and a waveform interpolation processing unit 116*a*.

The pitch register 106 temporarily stores a replay pitch data integer part P and a replay pitch data decimal part p read from the sound source control parameter RAM 101 via the RAM arbitration unit 117, and outputs the stored replay pitch data integer part P and replay pitch data decimal part p to the adder 112.

The selector 107 selects either of the waveform address decimal part a of the address (a next read address in the memory 12) calculated by the adder 112, or the waveform address decimal part a read from the sound source control parameter RAM 101, and outputs to the address register 105.

The selector 108 selects either of the waveform address integer part A inputted from the address register 104, or the waveform address decimal part a inputted from the address register 105, and outputs to the adder 112.

The selector 109 selects any of the waveform address integer part A inputted from the address register 103, the address step value n inputted from the step value register 111, the waveform address decimal part a inputted from the address register 105, and the wave peak value W inputted from the waveform computation unit 116, and outputs to the sound source control parameter RAM 101 via the RAM arbitration unit 117.

The subtractor 110 subtracts the waveform address integer part A in the current read address inputted by the address register 104, from the waveform address integer part A in the next read address inputted by the address register 103, and computes the address step value n. The subtractor 110 then outputs the computed address step value n to the step value register 111.

The step value register 111 temporarily stores the address step value n inputted from the subtractor 110, and outputs the stored address step value n to the entry data generation unit 113.

The adder 112 adds the waveform address integer part A or the waveform address decimal part a inputted from the selector 108, and the replay pitch data integer part P or the replay pitch data decimal part p inputted from the pitch register 106. The adder 112 then outputs the addition result to the address register 103 or the selector 107. It is to be noted that, in a case where rounding up to an integer occurs by addition of the waveform address decimal part a and replay pitch data decimal part p, the adder 112 generates a carry signal, and the rounding up is reflected in the addition result of the waveform address integer part A and the replay pitch data integer part P.

The entry data generation unit 113 operates by way of a count upwards of the master counter mc, and generates information (referred to below as "entry data") for reading data of a musical sound next generated, from the memory 12, in accordance with the replay mode value m inputted from the mode register 102. The entry data is a collection of parameters for reading the data of the musical sound generated in a next sampling cycle, from the memory 12.

Specifically, the master counter mc, the replay mode value m from the mode register 102, the address step value n from the step value register 111, the waveform address integer part A from the address register 103, and the waveform address integer part A from the address register 104 are inputted to the entry data generation unit 113. In a case where it is expressed that the inputted replay mode value m is replayed based on PCM, the entry data generation unit 113 sets the waveform address integer part A inputted from the address register 103 to the read address (referred to below as "request address") of the memory 12. On the other hand, in a case where it is expressed that the inputted replay mode value m is replayed based on differential PCM, the entry data generation unit 113 sets a result of adding the waveform address integer part A inputted from the address register 104 and the address step value n, to the read address (referred to below as "request address") of the memory 12

Then, with the set request address, the number of words (referred to below as "number of request words") representing read data size, a channel number (any of ch0 to ch127), start flag f representing whether or not sound generation has started, and the replay mode value m, as entry data, the entry data generation unit 113 outputs to a waveform memory interface unit 200. At this time, with an entry request signal representing outputting entry data to the waveform memory interface unit 200 in a valid state (for example, high level), the entry data generation unit 113 outputs the entry data.

It is to be noted that in a case of a representation that the inputted replay mode value m replays based on PCM, the number of request words representing one sample amount in sample data of the waveform is specified, based on a read address. On the other hand, in a case of a representation that the inputted replay mode value m replays based on differential PCM, the number of request words representing a sample amount corresponding to the number of steps, is specified, based on a read address. That is, with differential PCM, since only the difference from a preceding sample is shown, as waveform sample data, in a case where the number of steps is 2 or more, in order to accumulate sample data from the current address up to the read address, a word number request to read this is specified.

Here, along with a time slot start for each channel, in synchronization with the master counter mc, the entry data generation unit 113 outputs the entry data of the channel in question to the waveform memory interface unit 200. Since output of the entry data does not accompany access to the memory 12, the waveform sample data is read and output is finished early, in comparison to a case of continuing until a process of generating a musical sound.

There is then no constraint on time slots for each channel, and thereafter waveform sample data read from the memory 12 by the waveform memory interface unit 200 is used until a time slot finish of the channel in question in the next sampling cycle, and a musical sound is generated by the waveform computation unit 116.

The read address computation circuit 114 computes a read address of a sample data buffer RAM 250 for the waveform memory interface unit 200, in accordance with the master counter mc that is sequentially inputted, and outputs to the sample data buffer RAM 250. Specifically, the master counter mc, the replay mode value m, the waveform address integer part A stored by the address register 103, and the waveform address integer part A stored by the address register 104, are inputted to the read address computation circuit 114. Then, based on the waveform address integer part A stored by the address register 103 or the waveform address integer part A stored by the address register 104, the read address computation circuit 114 generates an address of the sample data buffer RAM 250 corresponding to the replay mode value m, for each of the channels ch0 to ch127. The read address computation circuit 114 outputs the address of the sample data buffer RAM 250 that has been generated, to the sample data buffer RAM 250, for each of the channels ch0 to ch127, in synchronization with the master counter mc.

The previous step value register 115 temporarily stores the address step value n read from the sound source control parameter RAM 101 via the RAM arbitration unit 117, and outputs the stored address step value n to the waveform computation unit 116. The address step value n stored by the previous step value register 115 is an address step value computed for the previous sampling cycle, with respect to each channel.

The waveform computation unit 116 generates a digital signal representing a replayed musical sound, from waveform sample data read from the sample data buffer RAM 250 of the waveform memory interface unit 200, and outputs the generated digital signal to the mixer 21. Specifically, the waveform address decimal part a and the waveform sample data read from the sample data buffer RAM 250 are inputted to the waveform computation unit 116. The waveform computation unit 116 then refers to the waveform sample data read from the sample data buffer RAM 250 and computes the wave peak value W.

Furthermore, the waveform computation unit 116 is provided with a waveform interpolation processing unit 116*a* that uses the waveform address decimal part a to perform interpolation processing (for example, liner interpolation or the like) among the waveform sample data. In a case in which an address between the sample data is specified, the waveform computation unit 116 computes the wave peak value W by performing waveform interpolation processing by the waveform interpolation processing unit 116*a*. That is, a digital signal indicating a musical sound is generated by the waveform computation unit 116. The waveform computation unit 116 then outputs the computed wave peak value W to the selector 109. Furthermore, the waveform computation unit 116 outputs the generated digital signal to the mixer 21.

Configuration of Waveform Memory Interface Unit 200

When entry data is inputted from the waveform generation unit 100, the waveform memory interface unit 200 temporarily stores the inputted entry data, and reads waveform sample data corresponding to the stored entry data from the memory 12, at timing at which the bus 14 is in an empty state.

The waveform memory interface unit 200 then temporarily stores the read waveform sample data, and outputs the stored waveform sample data, in response to a read request (input of an address by the read address computation circuit 114) from the waveform generation unit 100, to the waveform generation unit 100.

Figure 5:
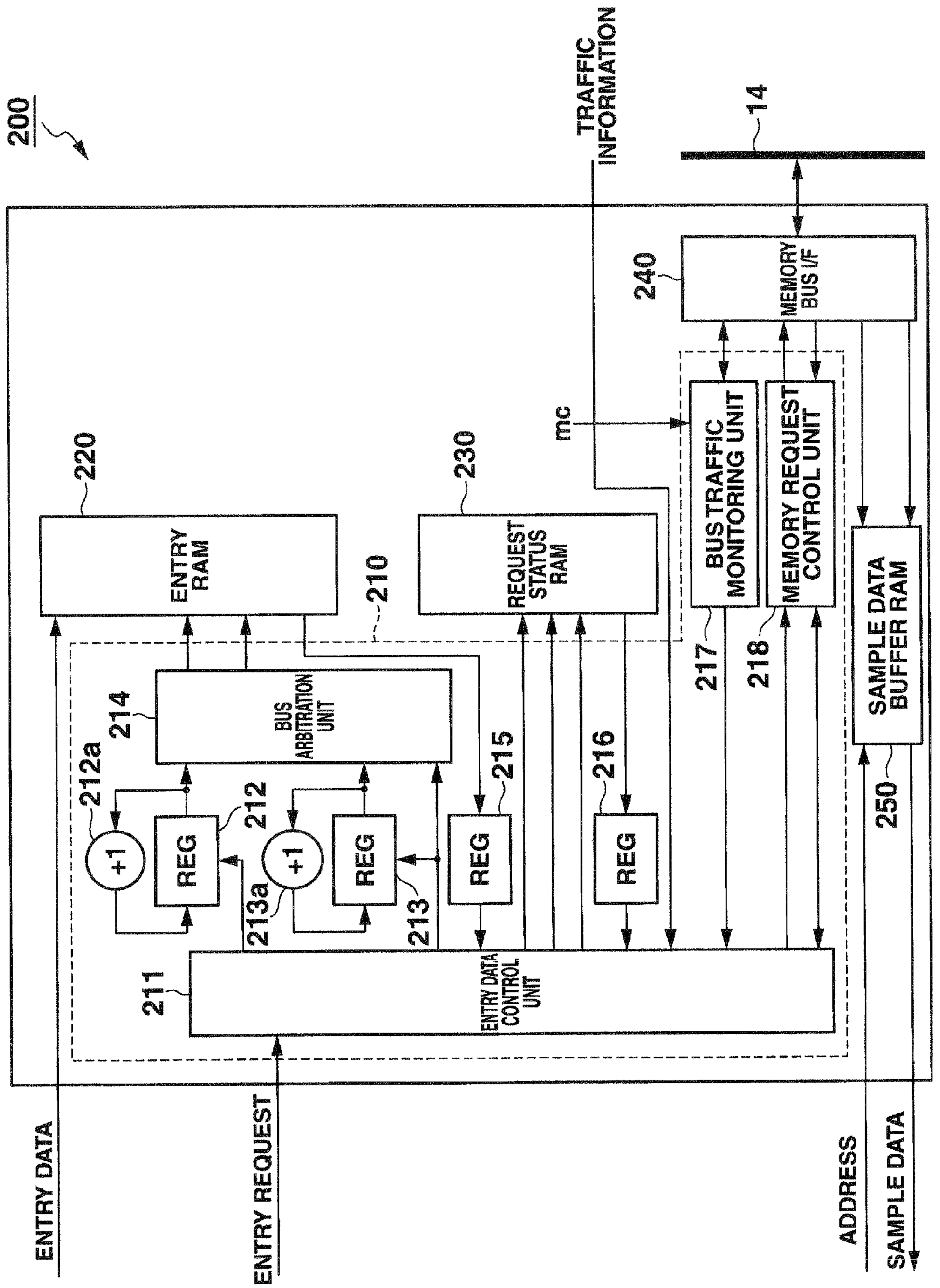
FIG. 5 is a block diagram showing a specific configuration of a waveform memory interface unit.

FIG. 5 is a block diagram showing a specific configuration of the waveform memory interface unit 200.

In FIG. 5, the waveform memory interface unit 200 is provided with an entry processing unit 210, an entry RAM 220, a request status RAM 230, a memory bus interface unit 240, a and sample data buffer RAM 250.

When the entry data is inputted from the waveform generation unit 100, the entry processing unit 210 stores the entry data in an area formed for each sound generation channel in the entry RAM 220. Furthermore, on reading waveform sample data from the memory 12 in accordance with the entry data, the entry processing unit 210 generates request status information (described later) representing content of the previous read request, based on a reading result. The entry processing unit 210 then stores the request status information in an area formed for each channel in the request status RAM 230.

Furthermore, the entry processing unit 210 generates specific information (referred to below as "memory request information", as appropriate) for reading waveform sample data from the memory 12, based on the request status information and the entry data. The entry processing unit 210 reads the waveform sample data from the memory 12 via the bus 14, in accordance with the memory request information.

Moreover, the entry processing unit 210 refers to a monitoring signal from a bus traffic monitoring unit 217 provided in each part, functioning as a bus master, and determines the data amount read at a time from the memory 12. That is, in a case where empty bus time per unit of time is longer, the entry processing unit 210 sets the data amount read at a time from the memory 12 to be larger, and in a case where the empty bus time per of unit time is shorter, sets the data amount read at a time from the memory 12 to be smaller.

As shown in FIG. 5, the entry processing unit 210 is provided with an entry data control unit 211, a write pointer register 212, an incrementer 212*a*, a read pointer register 213, an incrementer 213*a*, a bus arbitration unit 214, an entry data register 215, a status data register 216, a bus traffic monitoring unit 217, and a memory request control unit 218.

On receiving an entry request signal from the waveform generation unit 100, the entry data control unit 211 inputs a latch signal to the write pointer register 212, and increments by 1 an address indicated by the write pointer.

Furthermore, entry data from the entry data register 215 and request status information from the status data register 216 are inputted to the entry data control unit 211. The entry data control unit 211 then generates the memory request information based on the entry data and the request status information. For example, the entry data control unit 211 refers to an address and number of words shown in the entry data, and the an address and number of words that have been read, as shown in the request status information, and generates memory request information so as to read data subsequent to data that has already been read. The entry data control unit 211 then outputs the generated memory request information to the memory request control unit 218.

Here, the entry data control unit 211 refers to traffic information from the bus traffic monitoring unit 217 and a bus traffic monitoring unit provided in another bus master, and while dynamically determining the data amount read at a time from the memory 12, a read data amount that has been determined is included in the memory request information. As a result, an operation in which the waveform sample data are read to the waveform memory interface unit 200 from the memory 12 is performed efficiently in accordance with an empty state of the bus 14.

Furthermore, when the reading of the waveform sample data shown in the memory request information from the memory 12 is complete, a signal indicating reception completion is inputted to the entry data control unit 211 from the memory request control unit 218. In a case where preparation for a subsequent reading from the memory 12 is completed, the entry data control unit 211 outputs new memory request information to the memory request control unit 218, and data reading continues.

Furthermore, when reading of the waveform sample data of each channel via the memory request control unit 218 is performed, the entry data control unit 211 outputs a write enable signal together with an address of the request status RAM 230 corresponding to a result of the reading (an address specifying a storage area of each channel) and write data (that is request status information) to the request status RAM 230. Furthermore, in a case of reading entry data from the entry RAM 220, the entry data control unit 211 outputs an address indicating a storage area of the same channel to the request status RAM 230, and stores the request status information from the address in question in the read status data register 216.

The write pointer register 212 stores a write pointer indicating a write address of the entry data in the entry RAM 220. The write pointer value is incremented by 1 by the incrementer 212*a*, in response to a latch signal outputted from the entry data control unit 211 each time an entry request signal is inputted, and returns to 0 when a maximum value is reached. In this way, each area of the entry RAM 220 is cyclically specified.

The read pointer register 213 stores a read pointer indicating a read address of the entry data in the entry RAM 220. The read pointer value is incremented by 1 by the incrementer 213*a*, with the read request signal as a latch signal, each time the entry data is read from the entry RAM 220 by the entry data control unit 211, and returns to 0 when a maximum value is reached. In this way, each area of the entry RAM 220 is cyclically specified.

The bus arbitration unit 214 arbitrates specification of a write address from the write pointer register 212 and specification of a read address from the read pointer register 213. As a result of the arbitration, in a case of receiving a specification of the write address from the write pointer register 212, the bus arbitration unit 214 outputs a write enable signal indicating that writing is possible, together with an address indicated by the write pointer to the entry RAM 220. On the other hand, as a result of the arbitration, in a case of receiving a specification of a read address from the read pointer register 213, the bus arbitration unit 214 outputs an address indicated by the read pointer to the entry RAM 220.

The entry data register 215 temporarily stores the entry data read from the entry RAM 220, and outputs the stored entry data to the entry data control unit 211.

The status data register 216 temporarily stores request status information read from the request status RAM 230, and outputs the stored request status information to the entry data control unit 211.

The bus traffic monitoring unit 217 counts the number of times a busy signal has been outputted, representing the fact that the waveform memory interface unit 200 as a bus master has obtained an access right with regard to the bus 14, and a count value is outputted to the entry data control unit 211 each one sample cycle. It is to be noted that the count value of the bus traffic monitoring unit 217 is reset each one sample cycle.

Figure 6:
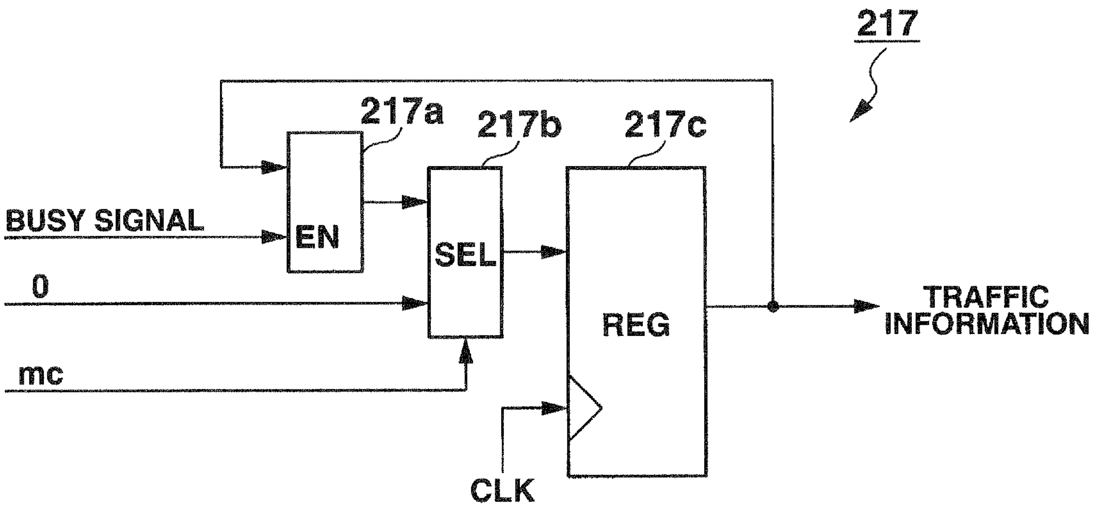
FIG. 6 is a block diagram showing a configuration example of a bus traffic monitoring unit.

FIG. 6 is a block diagram showing a configuration example of the bus traffic monitoring unit 217.

In FIG. 6, the bus traffic monitoring unit 217 is provided with an incrementer 217*a*, a selector 217*b*, and a register 217*c*.

A busy signal from the memory bus interface unit 240 and an output signal (count value) of the register 217*c* are inputted to the incrementer 217*a*. The incrementer 217*a* increments the output signal of the register 217*c* by 1, in response to a busy signal being inputted, and outputs to the selector 217*b*.

An output signal of the incrementer 217*a*, a zero signal, and the master counter mc are inputted to the selector 217*b*. The zero signal is a signal that invariably indicates a zero value. Then, in a case in which the value of the master counter mc is zero, the selector 217*b* selects the zero signal, and in a case in which the value of the master counter mc is not zero, selects the output signal of the incrementer 217*a*. The signal selected by the selector 217*b* is outputted to the register 217*c*.

A system clock is inputted to the register 217*c*, and a value indicated by the output signal of the selector 217*b* is held, in synchronization with respective clocks rising. The register 217*c* outputs an output signal (traffic information) indicating the value held to the incrementer 217*a* and the entry data control unit 211.

Returning to FIG. 5, on receiving memory request information from the entry data control unit 211, the memory request control unit 218 refers to the number of read words and the address of the memory 12 indicated in the memory request information, to read the waveform sample data from the memory 12. At this time, after obtaining an access right to the bus 14 via the memory bus interface unit 240, the memory request control unit 218 reads the waveform sample data from the memory 12.

Furthermore, on input of a reception completion signal (a signal indicating that reading of data from the memory 12 is completed) from the memory bus interface unit 240, the memory request control unit 218 notifies the entry data control unit 211 that data reading has been completed, and goes into a reception state for reading further data.

The entry RAM 220 is provided as local memory of the musical sound generation device 20, and stores entry data inputted from the waveform generation unit 100.

Figure 7:
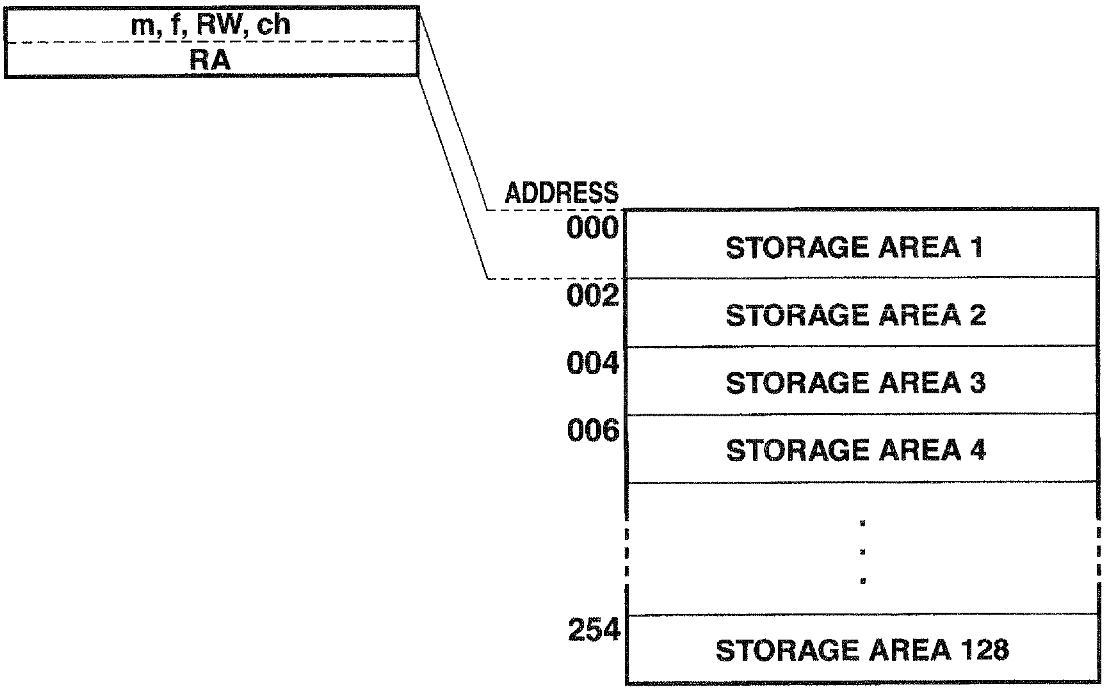
FIG. 7 is a schematic diagram showing a format of entry data.

FIG. 7 is a schematic diagram showing a format of entry data stored in the entry RAM 220.

In FIG. 7, the number of storage areas that can handle a case in which the channels ch0 to ch127 generate sound simultaneously, that is, 128 areas, are formed in the entry RAM 220, and the replay mode value m, the start flag f representing whether or not sound generation has started, the number of request words RW, channel number ch, and a request address RA are stored in respective storage areas. It is to be rioted that the addresses shown in FIG. 7 schematically represent the respective storage areas.

Furthermore, with regard to the respective storage areas, addresses are cyclically specified by a write pointer and a read pointer. That is, the entry RAM 220 forms a ring buffer that sequentially stores plural entry data.

Returning to FIG. 5, the request status RAM 230 is provided as local memory of the musical sound generation device 20, and stores request status information representing content of the previous read request inputted from the entry data control unit 211.

Figure 8:
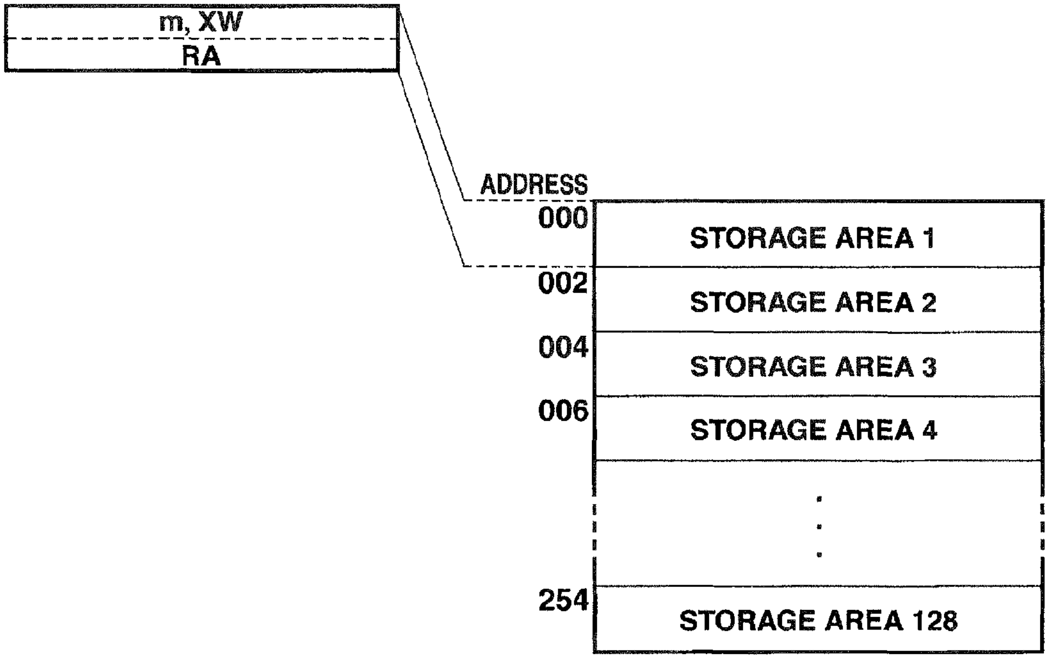
FIG. 8 is a schematic diagram showing a format of request status information.

FIG. 8 is a schematic diagram showing a format of request status information stored in the request status RAM 230.

In FIG. 8, in the request status RAM 230, storage areas are formed for request status information corresponding to respective entry data of the previous time for which waveform sample data have already been read from the memory 12. A request address RA processed in the previous sampling cycle, and based on the address, the number XW of words already read, and the replay mode value m are stored in the respective storage areas.

Furthermore, with regard to the respective storage areas, addresses are cyclically specified by a write pointer and a read pointer. That is, the request status RAM 230 forms a ring buffer that sequentially stores a plurality of request status entry data.

It is to be noted that the addresses shown in FIG. 8 schematically represent the respective storage areas.

Returning to FIG. 5, in a case of a request to read waveform sample data in the memory 12 from the memory request control unit 218, the memory bus interface unit 240 requests an access right with respect to the bus 14, and after obtaining the access right, reads the waveform sample data from the memory 12. At this time, the memory bus interface unit 240 outputs a busy signal indicating that it holds the access right to the bus 14, to the bus traffic monitoring unit 217.

Storage areas corresponding to the respective channels ch0 to ch127 are formed in the sample data buffer RAM 250, and the waveform sample data read from the memory 12 are stored in the respective storage areas.

Figure 9:
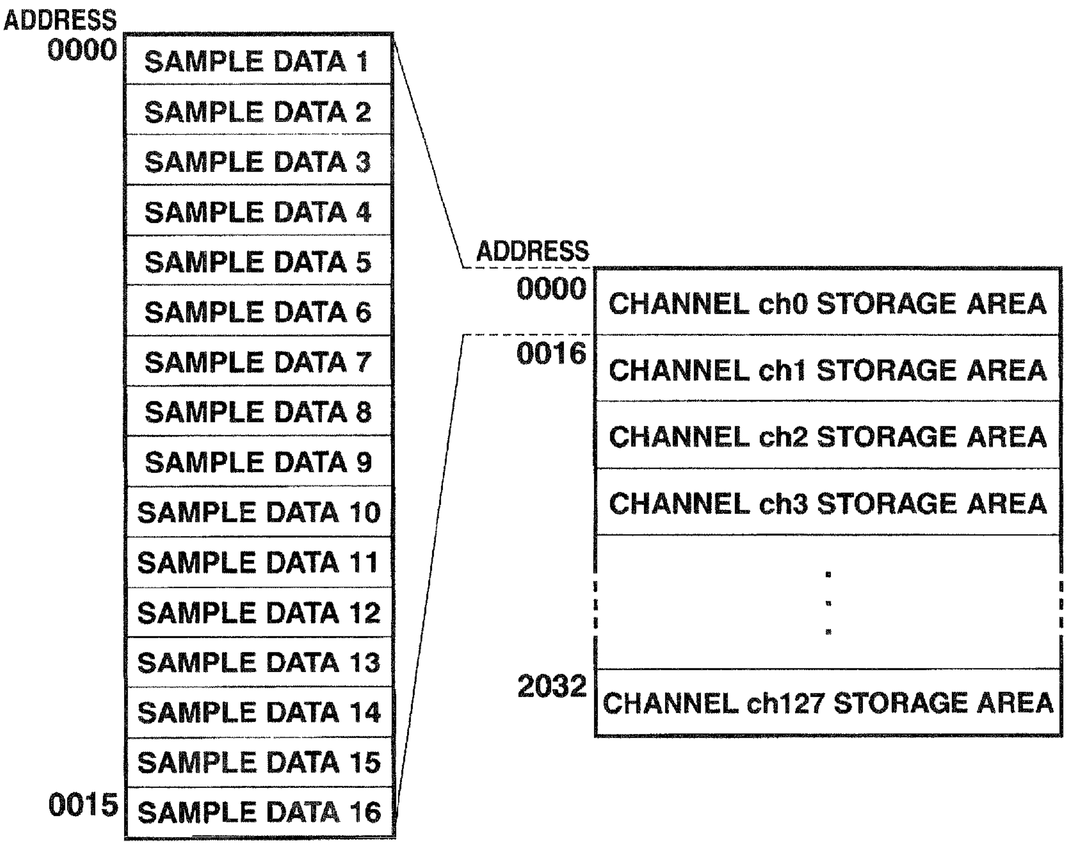
FIG. 9 is a schematic diagram showing a format of storage areas in a sample data buffer RAM.

FIG. 9 is a schematic diagram showing a format of storage areas in the sample data buffer RAM 250.

In FIG. 9, 128 storage areas corresponding to the channels ch0 to ch127 are formed in the sample data buffer RAM 250. Data representing a wave peak value W is stored in the storage area of each channel, and the number (number of words) of sample data stored in one storage area of the sample data buffer RAM 250 differs according to the replay mode value m (according to which of PCM or differential PCM is shown). Here, 16 sample data corresponding to a maximum of 16 addresses are stored in one storage area. It is to be noted that the addresses shown in FIG. 9 schematically represent respective storage areas.

With respect to the sample data buffer RAM 250, when an address of the sample data buffer RAM 250 is specified by the waveform generation unit 100, the waveform sample data stored in the addresses is outputted to the waveform generation unit 100.

It is to be noted that the sample data buffer RAM 250 is formed by dual port memory, and it is possible to simultaneously perform reading of data from the waveform generation unit 100 and writing of data from the memory bus interface unit 240. However, it is also possible for the sample data buffer RAM 250 to be formed by single port memory, by performing bus arbitration.

Operation

Next, a description is given of operation of the electronic musical instrument 1.

Below, operation of the electronic musical instrument 1 is described using FIG. 10 to FIG. 12, and FIG. 2 to FIG. 9 are referred to as appropriate.

Figure 10:
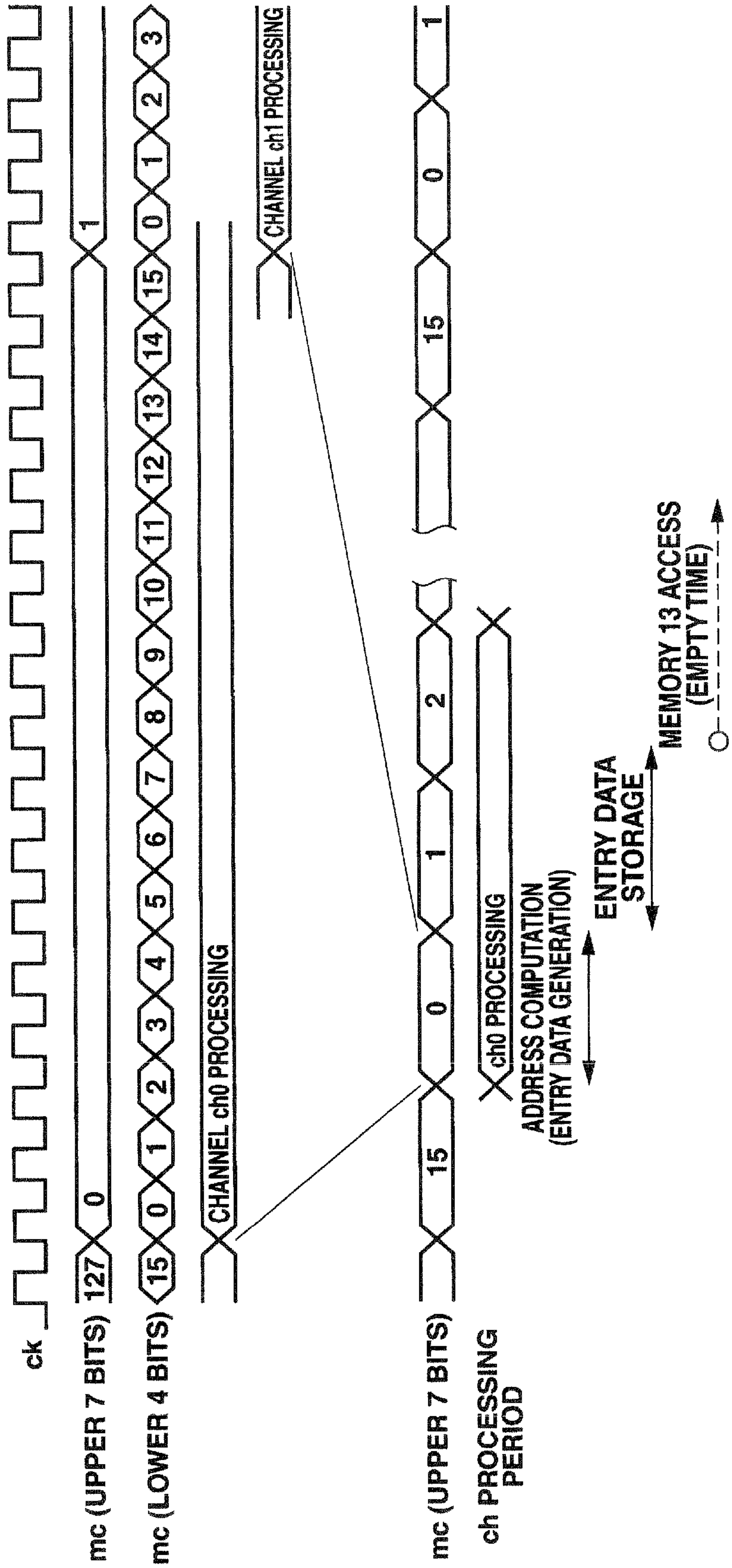
FIG. 10 is a schematic diagram showing relationships of master counter and time slots of respective channels.

FIG. 10 is a schematic diagram showing relationships of the master counter and time slots of respective channels;

As shown in FIG. 10, in the electronic musical instrument 1, one sampling cycle is defined by a period in which the upper 7 bits of the master counter mc does one round. Then, in one sample cycle; 128 time slots are formed corresponding to one count with respect to the upper 7 bits of the master counter mc. It is to be noted that the lower 4 bits of the master counter mc are divided into 16 fields of the respective time slots.

In a musical sound generation procedure in the electronic musical instrument 1, a process related to generating sound for each channel is divided into output of an address (entry data) of the memory 12 for reading the waveform sample data, and generation of a digital signal indicating waveform from the waveform sample data.

That is, the electronic musical instrument 1 performs output of entry data, as a process associated with the time slots of the respective channels, and with regard to generation of a digital signal indicating waveform and reading of the waveform sample data, selects and executes timing corresponding to an empty state of the bus 14.

Figure 11:
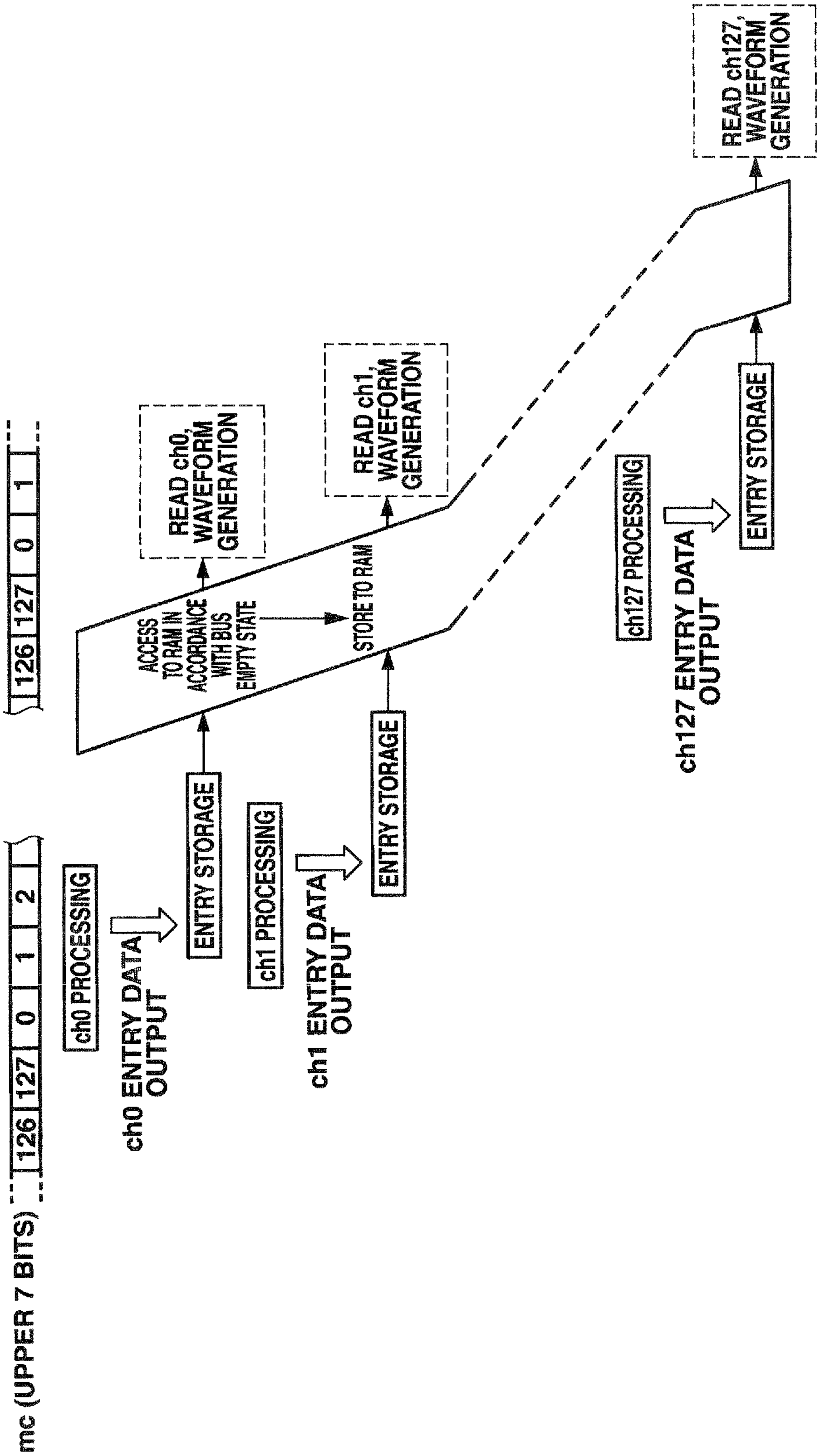
FIG. 11 is a schematic diagram showing a generation procedure of a musical sound generation device in an electronic musical instrument.

FIG. 11 is a schematic diagram showing a generation procedure of a musical sound in the electronic musical instrument 1.

As shown in FIG. 11, in each sampling cycle, when there is a transition to a time slot corresponding to each channel, the entry data generation unit 113 of the waveform generation unit 100 generates entry data in order to read musical sound data generated next from the memory 12, in accordance with the replay mode value m inputted from the mode register 102.

For example, after a time slot of channel ch0, the entry data generation unit 113 generates entry data for channel ch0.

It is to be noted that the entry data is generated by the entry data generation unit 113 only in a case in which sound is being generated for the channel in question.

The entry data generated by the entry data generation unit 113 is stored in the entry RAM 220 of the waveform memory interface unit 200, in accordance with the time slot in question, within the time slot in question, or accompanying completion of entry data generation after the time slot ending.

For example, the entry data generated in correspondence with the time slot of channel ch0 is stored in a storage area of the entry RAM 220 indicated by a write pointer, within the time slot of the channel ch0 or accompanying completion of entry data generation. At this time, in response to completion of writing of the entry data, an address indicated by the write pointer is incremented by 1. Furthermore, the read pointer indicates an address with a storage area smaller by at least 1 than the write pointer.

In the time slots of the respective channels, this type of entry data generation and storing in the entry RAM 220 are associated as essential processing.

After the time slot of the channel in question, the entry data control unit 211 of the waveform memory interface unit 200 determines an empty state (low traffic state) of the bus 14, based on traffic information of the bus 14 inputted from the respective bus traffic monitoring units. For example, if the count value total of busy signals of the bus 14 shown in traffic information inputted from the respective bus traffic monitoring units is less than or equal to a set reference value, the waveform memory interface unit 200 judges that the occupation rate of the bus 14 is low, and starts a process (burst transfer process) to read waveform sample data of a set data amount from the memory 12. Furthermore, from this state, in a case where the count value has increased, the waveform memory interface unit 200 causes a decrease from the set data amount and reads from the memory 12, and in a case where the count value has decreased, causes an increase from the set data amount and reads from the memory 12.

A process of reading the waveform sample data can be performed by collectively reading a plurality of channels; for example, it is possible to read waveform sample data collectively from the memory 12, in correspondence with entry data of channels ch0 to ch3 during sound generation, in response to an empty state of the bus 14.

This type of read waveform sample data is stored in the sample data buffer RAM 250 of the waveform memory interface unit 200, to form a cached state.

It is to be noted that the waveform sample data is read from the memory 12 after a time slot in which entry data are outputted, and the sample data buffer RAM 250 forms a cached state at latest until the time slot of the channel in question in the next sampling cycle.

On finishing the abovementioned sampling cycle in which entry data of the channels ch0 to ch127 are generated, in the next sampling cycle, the waveform computation unit 116 sequentially reads the waveform sample data of the channels ch0 to ch127 from the sample data buffer RAM 250, and outputs the musical sound (that is, a digital signal representing a waveform of the musical sound) to the mixer 21.

By this type of operation, a musical sound is generated after almost one sampling cycle of a time slot in which the entry data has been generated. It is to be noted that since the sampling frequency is approximately 44 kHz, one sampling cycle is approximately 0.02 ms, and the musical sound is replayed almost without delay.

Specific Operation Example

Next, a description is given concerning a specific example in which musical sound is actually generated in the electronic musical instrument 1.

FIG. 12 is a schematic diagram showing states in which entry data is stored in the entry RAM 220.

Below, referring to FIG. 12 a description is given concerning an example in which channel ch3 and channel 10 start generating sound, and then, along with the sound generation of channel 3 being stopped, the sound generation of channel 16 starts.

In FIG. 12, in a sampling cycle T1, entry data E031 of channel 3 and entry data E101 of channel 10 in which sound generation has started are stored in address 001 and address 002 of the entry RAM 220.

According to FIG. 12, the entry data E031 is entry data written in the sampling cycle T1, and it is shown that the replay mode has 16 bit PCM, start flag 1 (start of sound generation), number of read words 2, channel 3, and read address "00000000h" (h indicates a hexadecimal representation). Furthermore, the entry data E101 is entry data written in the sampling cycle T1, and it is shown that the replay mode has 16 bit PCM, start flag 1 (start of sound generation), number of read words 2, channel 10, and read address "00000100h".

It is to be noted that when the sampling cycle T1 finishes, the write pointer (WP in FIG. 12) indicates an address 003, and the read pointer (RP in FIG. 12) indicates an address 001.

Next, in sampling cycle T2, entry data E032 of channel 3 and entry data E102 of channel 10 in which sound is being generated are stored in address 003 and address 004 of the entry RAM 220.

In the entry data E032, there is change with respect to the entry data E031 to a start flag 0 (not the start of sound generation) and read address "00000002h". Furthermore, in the entry data E102, there is a change with respect to the entry data E101 to a start flag 0 (not the start of sound generation) and read address "00000102h".

It is to be noted that when the sampling cycle T2 finishes, the write pointer indicates an address 005, and the read pointer indicates an address 003.

Next, in sampling cycle T3, entry data E103 of channel 10 in which sound is being generated and entry data E161 of channel 16 in which sound generation has started, are stored in address 005 and address 006 of the entry RAM 220.

In the entry data E103, with respect to the entry data E102 there is a change to read address "00000104h". Furthermore, the entry data E161 is entry data written in sampling cycle T3, and it is shown that the replay mode has 16 bit PCM, start flag 1 (start of sound generation), number of read words 2, channel 16, and read, address "00040000h".

Here, it is understood that since the entry data of channel 3 is not stored in the entry RAM 220, for channel 3 the entry data of the sampling cycle T2 is the last, and sound generation is finished.

It is to be noted that when the sampling cycle T3 is finished, the write pointer indicates address 007 and the read pointer indicate's address 005.

Processing Algorithm of Electronic Musical Instrument 1

Next, a description is given concerning a processing algorithm of the electronic musical instrument 1, implementing the above described operations.

The processing algorithm of the electronic musical instrument 1 is configured principally by 2 processes: an entry data generation process and a waveform generation process.

Entry Data Generation Processing

Figure 13:
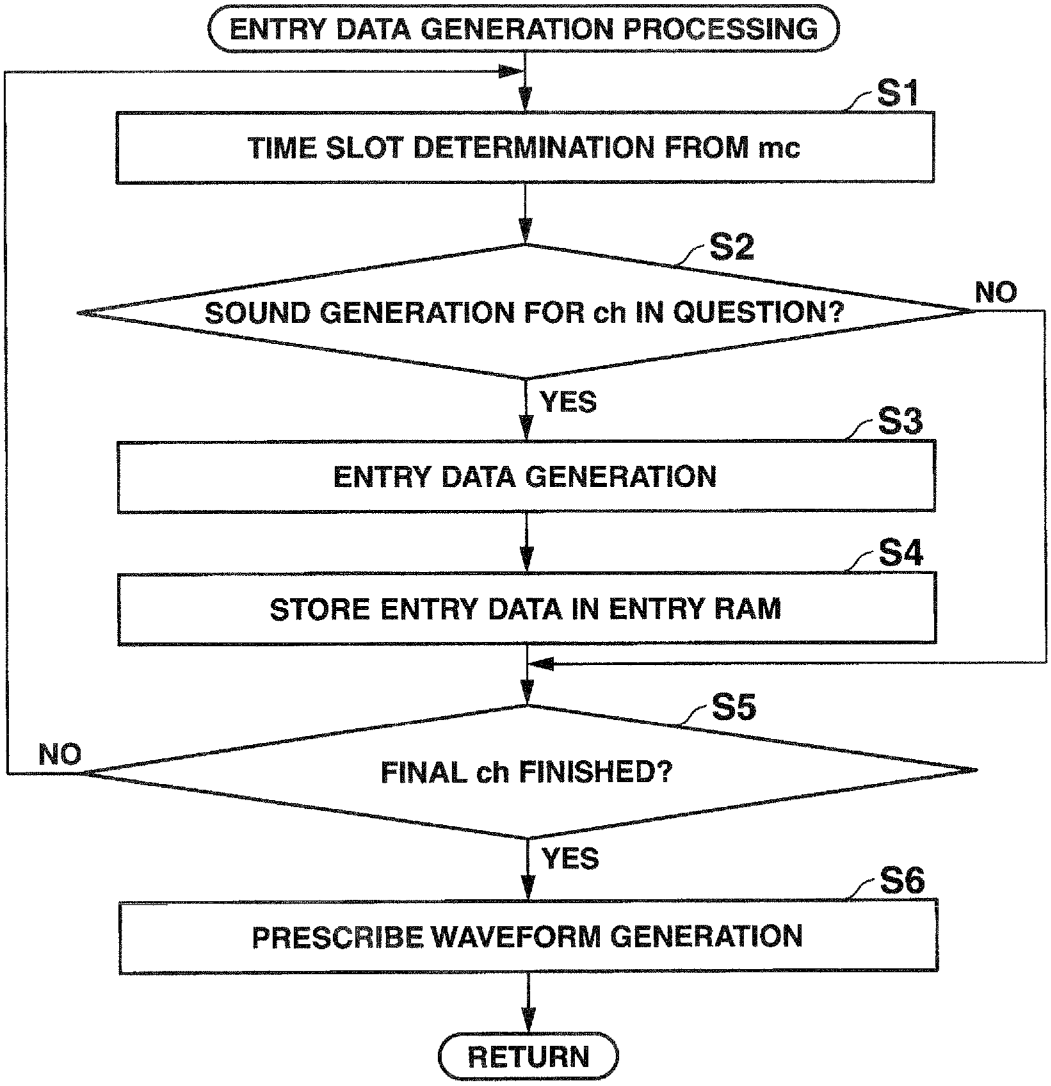
FIG. 13 is a flowchart showing entry data generation processing.

FIG. 13 is a flowchart showing entry data generation processing.

The entry data generation processing is executed by the waveform generation unit 100 of the musical sound generation device 20, and after starting with a power supply of the electronic musical instrument 1 being turned ON, the execution is repeated until the power supply is turned OFF.

In FIG. 13, when the entry data generation processing is stared, the waveform generation unit 100 in step S1 determines the current time slot based on the master counter mc. Specifically, the waveform generation unit 100 determines which channel the current time slot corresponds to.

In step S2, the waveform generation unit 100 makes a determination as to whether or not there is generated sound of a channel corresponding to the time slot in question. That is, the waveform generation unit 100 determines whether or not a key-pressing action corresponding to the channel in question is carried out.

In a case in which there is no sound generation for a channel corresponding to the time slot in question, a determination of NO is made in step S2, and processing proceeds to step S5.

Against this, in a case in which there is sound generation for a channel corresponding to the time slot in question, a determination of YES is made in step S2, and processing proceeds to step S3.

In step S3, the waveform generation unit 100 generates entry data of a channel in which sound is generated.

In step S4, the waveform generation unit 100 stores entry data in the entry RAM 220. At this time, the entry data is written to an address of the entry RAM 220 indicated by the write pointer.

In step S5, the waveform generation unit 100 determines, with respect to one sampling cycle, whether or not a time slot of the final channel has ended.

In a case in which, in one sampling cycle, the time slot of the final channel has not ended, a determination of NO is made in step S5, and processing transitions to step S1.

Against this, in a case in which, in one sampling cycle, the time slot of the final channel has ended, a determination of YES is made in step S5, and processing transitions to step S6.

In step S6, the waveform generation unit 100, with respect to a channel generating sound, prescribes generation of a waveform of one sample cycle to the waveform computation unit 116.

When this type of processing of step S6 ends, the entry data generation processing ends.

In FIG. 13, the processing of waveform generation specifying (step S6) is executed after ending of the entry data generation of all channels, but this processing may also be performed at predetermined timing in a time slot interval before this.

Waveform Generation Processing

Figure 14:
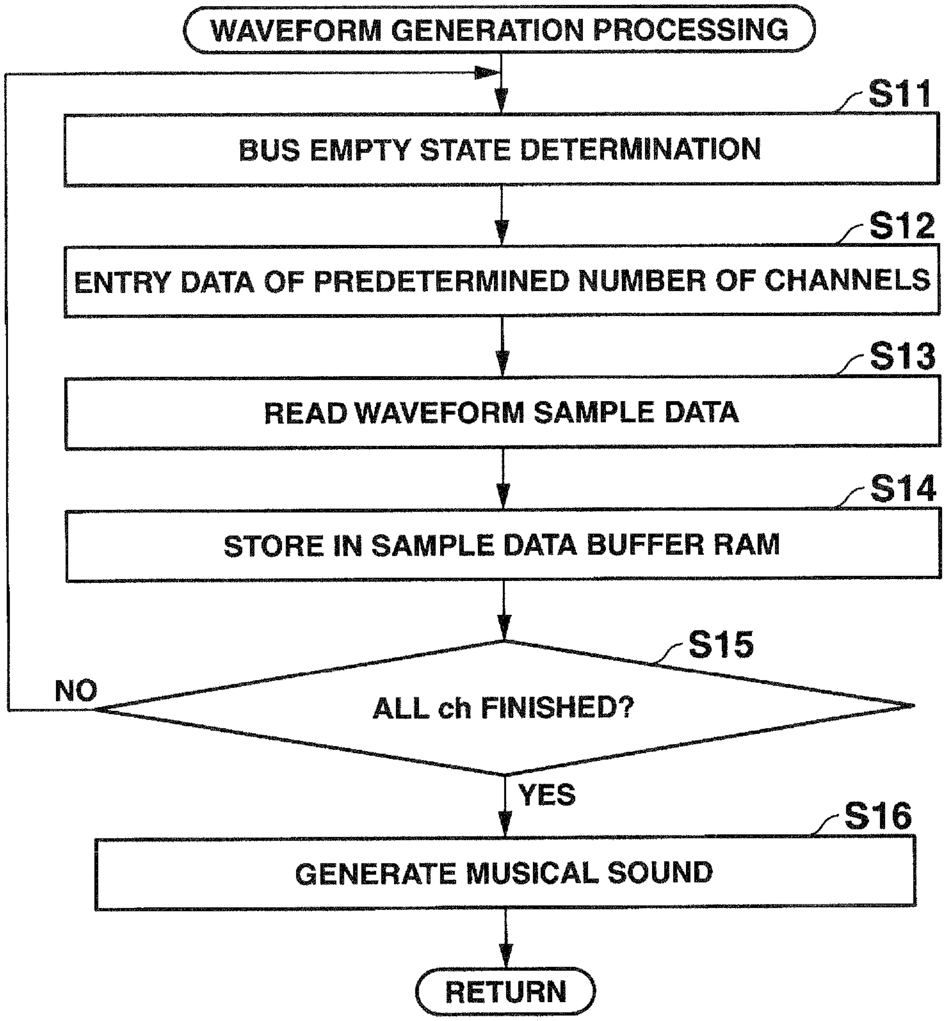
FIG. 14 is a flowchart showing waveform generation processing.

FIG. 14 is a flowchart showing waveform generation processing.

The waveform generation processing is executed by the waveform memory interface unit 200 of the musical sound generation device 20, and after starting with the power supply of the electronic musical instrument 1 being turned ON, the execution is repeated until the power supply is turned OFF.

In FIG. 14, when the waveform generation processing is started, the waveform memory interface unit 200 determines an empty state of the bus 14, in step S11.

In step S12, the waveform memory interface unit 200 reads entry data of the number of channels corresponding to an empty state from the entry RAM 220. At this time, the entry data is read sequentially from an address of the entry RAM 220 indicated by the read pointer.

In step S13, the waveform memory interface unit 200 refers to the read entry data and reads waveform sample data from the memory 12.

In step S14, the waveform memory interface unit 200 stores the waveform sample data read from the memory 12 in the sample data buffer RAM 250.

In step S15, the waveform memory interface unit 200 performs a determination as to whether or not the waveform sample data of all channels in one sampling cycle have been read from the memory 12.

In a case in which the waveform sample data of all channels in one sampling cycle have not been read from the memory 12, a determination of NO is made in step S15, and processing proceeds to step S11.

Against this, in a case in which the waveform sample data of all channels in one sampling cycle have been read from the memory 12, a determination of YES is made in step S15, and processing proceeds to step S16.

In step S16, the waveform memory interface unit 200 generates a digital signal representing a waveform of a musical sound from the waveform sample data of each channel stored in the sample data buffer RAM 250. In step S16, the waveform memory interface unit 200 outputs a digital signal representing a waveform of a musical sound of each channel.

In this way, musical sounds of respective channels are synthesized by the mixer 21, and the musical sounds are outputted from a speaker or the like, via the DAC 22.

In FIG. 14, the musical sound generation processing (step S16) is executed after ending the waveform sample data reading of all channels, but the processing may also be performed at predetermined timing within an earlier time slot interval.

As described above, the electronic musical instrument 1 according to the present embodiment stores the waveform sample data in the memory 12 as a shared memory, and generated sound of a plurality of channels corresponding to a polyphonic number is processed by time division, by the musical sound generation device 20.

With regard to each channel in which sound is generated, the electronic musical instrument 1 performs generation of entry data indicating a read address of the memory 12, in a time slot of the channel in question, to be stored in the entry RAM 220.

Thereafter, the electronic musical instrument 1 reads the waveform sample data of a predetermined channel from the memory 12, in response to an empty state of the bus 14, to e stored in the sample data buffer RAM 250, which is local memory.

When the waveform sample data of all channels in which sound is generated is stored in the sample data buffer RAM 250, with respect to one sampling cycle, digital signals of a waveform presenting a musical sound are generated sequentially, with respect to each channel, and outputted to the mixer 21.

Therefore, compared to a case, in a time slot of each channel, of performing computation of a read address of the memory 12, reading of the waveform sample data from the memory 12, and as far as generation of a digital signal of a waveform representing a musical sound, it is possible to realize a reduction in processing amount in each time slot.

That is, according to the present invention, it is possible to raise the efficiency of processing for generating musical sound in the musical sound generation device.

Furthermore, since the waveform sample data is read from the memory 12 using time in a period outside of a time slot of each channel, it is possible to access the memory 12 at more appropriate timing.

Furthermore, when the waveform sample data is read from the memory 12, in order to determine the data amount read at one time, by referring to the traffic information of the bus 14, it is possible to perform reading of data more rapidly in a permitted range in accordance with an empty state of the bus 14.

Furthermore, in the electronic musical instrument 1 according to the present embodiment, a storage area of the entry RAM 220 is cyclically specified by a write pointer and a read pointer.

Therefore, in the electronic musical instrument 1, with regard to continuously reading the waveform sample data in the plurality of channels, it is possible to write or read data that are a target of reading for each channel, in appropriate sequence.

Modified Example

In the first embodiment, a description was given in which, in a case of reading entry data stored in the entry RAM 220, reading is performed in writing sequence, and the waveform sample data are read from a read address of the memory 12 indicated by the entry data.

Against this, it is possible to refer to the entry data of a plurality of channels within one sampling cycle, and to change the entry data processing sequence (reading sequence), so as to collectively read continuous read addresses of the memory 12.

That is, by referring to read addresses with respect to entry data of the plurality of channels stored in the entry RAM 220, and rearranging the entry data in a sequence in which address continuity is higher, it is possible to sequentially read the entry data by the read pointer.

In a case of performing this type of processing, since it is possible to increase the data amount in a burst transfer from the memory 12, the usage efficiency of the bus 14 can be increased, and it is possible to perform processing to generate musical sound more efficiently.

It is to be noted that the present invention is not limited to the embodiment described above, and modifications, improvement and the like that are within a scope in which an object of the present invention can be realized, are included in the present invention.

In the embodiment described above, a description was given of an example of a case in which the musical sound generation device 20 to which the present invention is applied is a sound source of an electronic musical instrument, but there is no particular limitation to this.

For example, the present invention can be applied generally to an electronic device having a sound generation function. Specifically, as examples the present invention can be applied to notebook personal computers, mobile terminals, portable game machines, or the like.

The series of processing described above can be executed by hardware, and can be executed by software.

In other words, configurations in FIGS. 2, 3, and 5 are only examples, and there is no particular limitation. That is, it is sufficient if a function that can execute the overall series of processing described above is provided in the musical sound generation device 20, and there is no particular limitation to the examples of FIGS. 2, 3, and 5, as to how functional blocks are used in order to realize the functions.

Furthermore, one functional block may be configured by a hardware unit, or may be configured by a software unit, or may be configured by a combination thereof.

In a case of executing the series of processing by software, a program configuring the software is installed from a network or a recording medium, to a computer or the like.

The computer may be a computer embedded in dedicated hardware. Or, the computer may be a computer in which various types of function are executed by installing various types of program, for example, a general purpose personal computer.

A recording medium that contains this type of program may be configured not only by removable media 31 of FIG. 1 distributed separately from a device main unit in order to provide a program to a user, but may be configured by a recording medium provided to the user in a state of being embedded in advance in the device main unit. The removable media 31 is configured, for example, by a magnetic disk (including a floppy disk), an optical disk, a magnetic optical disk, or the like. An optical disk is configured, for example, by a CD-ROM (Compact Disk-Read Only Memory), a DVD (Digital Versatile Disk), or the like. A magnetic optical disk is configured by an MD (Mini-Disk) or the like. Furthermore, the recording medium provided to the user in a state of being embedded in advance in the device main unit is configured, for example, by the ROM 12 of FIG. 1 in which a program is recorded, a hard disk contained in the storage unit 18 of FIG. 1, or the like.

It is to be noted that in the present specification, steps describing a program recorded in the recording medium clearly include processing performed chronologically with a sequence thereof, but need not necessarily be processing chronologically and can be processing executed in parallel or individually.

Furthermore, in the present specification, system terminology represents general devices configured by a plurality of devices, a plurality of instruments, or the like.

A description has been given above concerning several embodiments of the present invention, but these embodiments are merely examples and are not intended to limit the technical scope of the present invention. The present invention can have various other embodiments, and in addition various types of modification such as abbreviations or substitutions can be made within a range that does not depart from the scope of the invention. These embodiments or modifications are included in the range and scope described in the present specification and the like, and are included in the invention and an equivalent range thereof described in the scope of the claims.

What is claimed is:

1. A musical sound generation device comprising:

a plurality of sound generation channels that generate musical sound;

an address calculator that calculates an address in order to read, from a waveform memory connected by a bus, waveform data to be assigned to the respective sound generation channels, by time division, for each of the sound generation channels;

an address memory that associates and stores addresses calculated by the address calculator and the sound generation channels;

a bus traffic detection unit that detects traffic information of the bus;

a waveform data reader that reads an address stored in the address memory, when it is determined that the bus is in a low traffic state based on the traffic information of the bus detected by the bus traffic detection unit, and reads waveform data from the waveform memory based on said read address;

a waveform generation prescription unit that prescribes assigning waveform data read by the waveform data reader to a corresponding sound generation channel, and generating a musical sound for the sound generation channel to which said waveform data is assigned; and a read data amount determination unit that determines a read data amount that is to be read from the waveform memory by the waveform data reader, based on an amount of traffic detected by the bus traffic detection unit.

2. A musical sound generation device comprising:

a plurality of sound generation channels that generate musical sound;

an address calculator that calculates an address in order to read, from a waveform memory connected by a bus, waveform data to be assigned to the respective sound generation channels, by time division, for each of the sound generation channels;

an address memory that associates and stores addresses calculated by the address calculator and the sound generation channels;

a waveform data reader that reads an address stored in the address memory, when it is determined that the bus is in a low traffic state based on detected traffic information of the bus, and reads waveform data from the waveform memory based on said read address;

a waveform generation prescription unit that prescribes assigning waveform data read by the waveform data reader to a corresponding sound generation channel, and generating a musical sound for the sound generation channel to which said waveform data is assigned;

a writing area prescription unit that prescribes a storage area of the address memory for storing an address calculated by the address calculator; and a reading area prescription unit that prescribes a storage area in which an address is read in the address memory;

wherein the writing area prescription unit and the reading area prescription unit cyclically prescribe a storage area of the address memory.

3. A non-transitory computer-readable storage medium having a program stored thereon which is executable by a computer to perform functions comprising:

calculating an address in order to read, from a waveform memory connected by a bus, waveform data to be assigned to respective ones of a plurality of sound generation channels for generating a musical sound, by time division, for each of the sound generation channels;

associating and storing the calculated addresses and sound generation channels in an address memory;

detecting traffic information of the bus;

reading an address stored in the address memory, when it is determined that the bus is in a low traffic stated based on the detected traffic information of the bus, and reading waveform data from the waveform memory based on said read address; and prescribing assigning the read waveform data to a corresponding sound generation channel, and generating a musical sound for the sound generation channel to which said waveform data is assigned;

wherein a data amount to be read from the waveform memory when the waveform data is read is based on an amount of traffic detected when detecting the traffic information of the bus.

4. A non-transitory computer-readable storage medium having a program stored thereon which is executable by a computer to perform functions comprising:

calculating an address in order to read, from a waveform memory connected by a bus, waveform data to be assigned to respective ones of a plurality of sound generation channels for generating a musical sound, by time division, for each of the sound generation channels;

associating and storing the calculated addresses and sound generation channels in an address memory;

reading an address stored in the address memory, when it is determined that the bus is in a low traffic stated based on detected traffic information of the bus, and reading waveform data from the waveform memory based on said read address; and prescribing assigning the read waveform data to a corresponding sound generation channel, and generating a musical sound for the sound generation channel to which said waveform data is assigned;

wherein the method further comprises cyclically specifying a storage area of the address memory by:

prescribing a storage area of the address memory for storing the calculated address; and prescribing a storage area in which an address is read in the address memory.

5. A musical sound generation method comprising:

calculating an address in order to read, from a waveform memory connected by a bus, waveform data to be assigned to respective ones of a plurality of sound generation channels for generating a musical sound, by time division, for each of the sound generation channels;

associating and storing the calculated addresses and sound generation channels in an address memory;

detecting traffic information of the bus;

reading an address stored in the address memory, when it is determined that the bus is in a low traffic state based on the detected traffic information of the bus, and reading waveform data from the waveform memory based on said read address; and prescribing assigning the read waveform data to the corresponding sound generation channel, and generating a musical sound for a sound generation channel to which said waveform data is assigned;

wherein a data amount to be read from the waveform memory when the waveform data is read is based on an amount of traffic detected by detecting the traffic information of the bus.

6. A musical sound generation method comprising:

calculating an address in order to read, from a waveform memory connected by a bus, waveform data to be assigned to respective ones of a plurality of sound generation channels for generating a musical sound, by time division, for each of the sound generation channels;

associating and storing the calculated addresses and sound generation channels in an address memory;

reading an address stored in the address memory, when it is determined that the bus is in a low traffic state based on detected traffic information of the bus, and reading waveform data from the waveform memory based on said read address;

prescribing assigning the read waveform data to the corresponding sound generation channel, and generating a musical sound for a sound generation channel to which said waveform data is assigned; and cyclically specifying a storage area of the address memory by prescribing a storage area of the address memory in order to store the calculated address and prescribing a storage area to read an address in the address memory.

7. A musical instrument comprising:

a waveform memory;

a musical sound generation device; and a bus connecting the waveform memory and the musical sound generation device to each other;

the musical sound generation device comprising:

a plurality of sound generation channels that generate musical sound;

an address calculator that calculates an address in order to read, from the waveform memory connected by the bus, waveform data to be assigned to the respective sound generation channels, by time division, for each of the sound generation channels;

an address memory that associates and stores addresses calculated by the address calculator and the sound generation channels;

a bus traffic detection unit that detects traffic information of the bus;

a waveform data reader that reads an address stored in the address memory, when it is determined that the bus is in a low traffic state based on the traffic information of the bus detected by the bus traffic detection unit, and reads waveform data from the waveform memory based on said read address;

a waveform generation prescription unit that prescribes assigning waveform data read by the waveform data reader to a corresponding sound generation channel, and generating a musical sound for the sound generation channel to which said waveform data is assigned; and a read data amount determination unit that determines a read data amount that is to be read from the waveform memory by the waveform data reader, based on an amount of traffic detected by the bus traffic detection unit.

8. A musical instrument comprising:

a waveform memory;

a musical sound generation device; and a bus connecting the waveform memory and the musical sound generation device to each other;

the musical sound generation device comprising:

a plurality of sound generation channels that generate musical sound;

an address calculator that calculates an address in order to read, from the waveform memory connected by the bus, waveform data to be assigned to the respective sound generation channels, by time division, for each of the sound generation channels;

an address memory that associates and stores addresses calculated by the address calculator and the sound generation channels;

a waveform data reader that reads an address stored in the address memory, when it is determined that the bus is in a low traffic state based on detected traffic information of the bus, and reads waveform data from the waveform memory based on said read address;

a waveform generation prescription unit that prescribes assigning waveform data read by the waveform data reader to a corresponding sound generation channel, and generating a musical sound for the sound generation channel to which said waveform data is assigned;

a writing area prescription unit that prescribes a storage area of the address memory for storing an address calculated by the address calculator; and a reading area prescription unit that prescribes a storage area in which an address is read in the address memory;

wherein the writing area prescription unit and the reading area prescription unit cyclically prescribe a storage area of the address memory.

* * * * *